United States Patent Office 2,719,142
Patented Sept. 27, 1955

2,719,142

PROCESS FOR POLYMERIZING POLYETHYLENICALLY UNSATURATED COMPOUNDS IN AN AQUEOUS MEDIUM

Christiaan Pieter van Dijk and Franciscus Johannes Fredericus van der Plas, Amsterdam, Netherlands, assignors to Shell Development Company, Emeryville, Calif., a corporation of Delaware No Drawing. Application February 19, 1952,
Serial No. 272,490

Claims priority, application Netherlands
February 23, 1951

19 Claims. (Cl. 260—78.4)

This invention relates to a process for polymerizing polyethylenically unsaturated organic compounds. More particularly, the invention relates to a novel process for polymerizing polyethylenically unsaturated organic compounds in an aqueous medium to produce improved heat-convertible polymers.

Specifically, the invention provides an efficient and economical process for polymerizing polyethylenically unsaturated organic compounds in an aqueous medium to produce heat-convertible polymers that are substantially free of branching and/or cross-linking, which process comprises polymerizing the said unsaturated compound in a two phase system comprising a solution of an emulsifying agent in water as the continuous phase and discontinuous phase containing the said unsaturated compound, preferably so as to effect a relatively high conversion of monomer to polymer, and at all times maintaining the concentration of the resulting polymer in the reaction zone below that level at which the polymer gels.

It is known that monomeric mixtures containing dienes, such as mixtures of butadiene-1,3 and styrene, may be polymerized to produce elastic vulcanizable products. While these synthetic products have rubber-like properties, they fail to possess the high quality of natural rubber. This is believed to be due to the difference in structure between the synthetic polymer and the natural polymer. It is assumed that the synthetic polymers and copolymers of the dienes consist of branched and/or cross-linked chains, whereas the natural rubber shows little if any branching or cross-linking. It has also been an established opinion heretofore that branching and cross-linking could be avoided only by reducing the per cent conversion of monomer to polymer. The processes for producing improved synthetic polymers have, therefore, tended to employ a low conversion rate with a resulting high final concentration of monomer. Such processes are obviously undesirable from an economic standpoint as they are highly inefficient and expensive to operate.

It is an object of the invention, therefore, to provide an improved process for polymerizing polyethylenically unsaturated compounds. It is a further object to provide a new process for preparing heat-convertible polymers of polyethylenically unsaturated compounds that are substantially free of branching and/or cross-linking. It is a further object to provide a method for preparing improved heat-convertible polymers of polyethylenically unsaturated compounds at high conversion rates. It is a further object to provide a method for preparing improved heat-convertible polymers that is highly efficient and economical to operate. It is a further object to provide a method for preparing heat-convertible polymers of polyethylenically unsaturated compounds that has improved heat control. It is still a further object to provide a method for preparing diene polymers that have properties similar to those of natural rubber. Other objects and advantages of the invention will be apparent from the following detailed description thereof.

It has now been discovered that these and other objects may be accomplished by the process of the invention which comprises polymerizing the polyethylenically unsaturated compound in a two phase system comprising a solution of an emulsifier in water as the continuous phase and a discontinuous phase containing the said unsaturated compound, preferably so as to effect a relatively high conversion of monomer to polymer, and at all times maintaining the concentration of the resulting polymer in the reaction zone below that level at which the polymer gels. The polymers and copolymers prepared in this manner are substantially free of branching and/or cross-linking and possess properties that were heretofore unknown in this type of polymer. The polymers prepared from the dienes have properties which are surprisingly very close if not identical to those of natural rubber.

The above-described process is based on the unexpected discovery that the factor for the degree of branching and/or cross-linking is not the conversion percentage but the concentration of the polymer. It has been found that there is very little if any cross-linking or branching when the concentration of the polymer remains at a low level, but when the concentration approaches a critical level, the polymer rapidly undergoes cross-linking and branching and the product gels. Thus, to avoid the branching and cross-linking it is only necessary to keep the concentration of the polymer below the critical level. When the polymer concentration is thus controlled, the process can, and preferably is, allowed to go to very high conversion rates. There is not the slightest objection to allowing the concentration of monomer to decrease to very minute values or to work continuously with a low concentration of monomer. Thus, besides yielding excellent products, the process of the invention is also attractive because of the high rates of conversion that may be obtained therewith.

Still further advantage of the process is found in the fact that with the great dilution there is little of any problem in dissipating the heat of reaction. This is particularly true when the process is operated on a continuous basis as described hereinafter as in that case it is only necessary to cool the aqueous phase feed. In many cases, cooling may even be dispensed with altogether.

The critical level for the concentration of the polymer is that just below the point where the polymer gels. This point will vary slightly with each particular type of monomer and the polymerization conditions, such as temperature, but can be easily determined for each individual case by making a few routine determinations. One preferred method for determining the gel point, for example, comprises following the viscosity of the polymer and noting that point at which there is a very rapid increase.

For all monomers of the type disclosed hereinafter at normal operating temperatures, e. g., 15° C. to 80° C., the polymer concentration should be at least below 7.5%, and more preferably below 5%. At the lower operating temperatures, e. g., between −30° C. to 0° C., higher polymer concentrations such as up to 16% may be tolerated without having the polymer gel. For the preferred monomers, i. e., the aliphatic compounds containing conjugated ethylenic groups such as butadiene-1,3, the polymer concentrations should preferably be maintained no greater than 7% and more preferably below 3%. These percentages as well as those stated hereinafter are all percentages by weight.

The concentration of the polymer in the reaction zone may be controlled by any suitable method. If the process is operated batchwise, the concentration may be controlled by stopping the polymerization before the concentration of polymer has reached the desired level. In a continuous process, the suspension produced may be drawn-off and fresh aqueous phase added at such a rate that the drawn-off suspension contains less than the desired amount of polymer.

When the concentration of the polymer is controlled as indicated, one may effect a high conversion of the monomer to polymer without causing the unexpected branching or cross-linking of the polymer. According to the invention, conversion percentages of at least 50 can be easily obtained, while conversion percentages of from 60 to 75 are still normal. Even with a conversion percentage of 90, with a normal content of chain-stopper (modifier), a readily soluble, gel free product is obtained. The conversion percentage referred to above is equal to the final concentration of the polymer divided by the sum of the final concentrations of polymer and monomer.

The concentration of the monomer remaining in the reaction zone at the end of the process is also indicative of the conversion of monomer to polymer, and it is sometimes desirable to express that condition in terms of the said concentration of monomer. The expression "concentration of monomer when polymerization has ended" or "final concentration of monomer" as used throughout the specification and claims in this regard and in the calculations of the conversion percentages as indicated above, have slightly different means according to the type of polymerization system employed. In the comparatively stable emulsion systems as described hereinafter, these expressions refer to the sum of the emulsified and the dissolved monomer. In the more coarsely dispersed systems mentioned below, they refer to the concentration of monomer dissolved in the suspension to be drained off.

The polymerization of the polyethylenically unsaturated compounds may be accomplished in any aqueous system made up of two phases, a continuous phase comprising a solution of an emulsifier in water and a discontinuous phase containing the said unsaturated compound.

One such system comprises the conventional emulsion medium wherein the monomer is present as fine droplets or bubbles which, if the monomer has the density of a liquid, have dimensions ranging from 0.001 to 1 mm. This system is usually obtained by adding the monomer to an aqueous medium containing the emulsifying agent and then stirring the mixture at a rapid rate to cause a fine dispersion of the monomer throughout the water phase.

Other systems, however, wherein the monomer is present in much larger particles may also be used. A system of this type is obtained by floating a layer of monomer over the aqueous medium and then stirring the aqueous medium at a very rapid rate so that monomer is flung from the upper layer into the aqueous phase and the particles then slowly ascend back into the monomer layer.

Another coarsely dispersed system that is particularly preferred is that obtained by passing the unsaturated monomer in the form of drops or bubbles through an aqueous medium containing emulsifying agent and polymerization catalyst under such conditions that the drops or bubbles rise or fall through the aqueous phase due primarily to the difference in density between the two phases, and the drops or bubbles that pass through the aqueous phase are then collected as a separate phase in contact with the aqueous medium. A portion of the collected phase is then preferably conducted back to the point of introducing the drops or bubbles. The monomer drops or bubbles in this case preferably have a diameter ranging from 0.1 to 2 centimeters, and more preferably from 0.1 to 1 centimeter. The drops or bubbles are introduced into the aqueous phase at a rate not more than 30 cm. per second, and preferably not in excess of 12 cm. per second. The conditions are preferably so arranged so as to permit at least about 90% of the monomer to be collected as a separate phase in contact with the aqueous phase. Recycling of the monomer phase is preferably accomplished in an outside conduit where the monomer may be cooled or, in the case of a mixture of monomers, have the concentrations adjusted to the desired level.

Still another attractive system is that obtained by stirring the reaction mixture, continuously withdrawing a portion of the dispersion, and at the same rate introducing a monomer emulsion which is of such a concentration as to maintain the concentration of the monomer in the reaction mixture substantially constant.

In case continuous polymerization takes place in a single reaction space that is being constantly stirred, low concentrations of polymer is of even greater importance than in other applications. In this case, very suitable concentrations are those below 3%, and more preferably below 1.5%.

The monomers to be polymerized by the process of the invention may be any substantially water-insoluble polyethylenically unsaturated organic compound. The expression "substantially water-insoluble" as used throughout the specification and claims, refers to those monomers which have at least some solubility in water so that some monomer may enter the aqueous phase but still have so little solubility in water that they are regarded as being relatively water-insoluble. Preferably, the monomers have a solubility in water at room temperature ranging from 0.1 to 20 parts per 100 parts of water.

The ethylenic groups in the monomer molecule may be in conjugated or non-conjugated relationship and may be present in a chain of carbon atoms or may be separated by various groups, such as functional groups as ester radicals, ether groups, and the like. Examples of polyethylenically unsaturated compounds include butadiene, isoprene, chloroprene, 1,3-pentadiene, 2-4-dimethylpentadiene, methyl-2-butadiene, diallyl phthalate, diallyl succinate, diallyl ether, allyl vinyl phthalate, allyl acrylate, methallyl acrylate, divinyl adipate, and the like. Particularly preferred monomers are the aliphatic compounds having an unbroken carbon chain between the two ethylenic groups, and more preferably those aliphatic compounds having the two ethylenic groups in conjugated relationship in an aliphatic chain of carbon atoms, such as butadiene-1,3, 2-methylbutadiene-1,3, 2,3-dimethylbutadiene, isoprene, chloroprene, 1,3-pentadiene, and the like.

The process may also be used to copolymerize the above-described polyethylenic unsaturated compounds with themselves or with other polymerizable compounds, and preferably those containing a single ethylenic linkage, such as styrene, vinyl naphthalene, chlorostyrene, alpha-methylstyrene, acrylonitrile, methacrylonitrile, chloroacrylonitrile, unsaturated acids, such as acrylic acid and the alpha-alkyl substituted acrylic acids, such as alpha-methyl acrylic acid; the esters of such acids, such as methyl acrylate, methyl methacrylate, butyl methacrylate, and propyl acrylate; the vinylidene halides, such as vinylidene chloride and vinylidene bromide; the vinyl esters of inorganic acids, such as the halogen acids and hydrocyanic acid as vinyl chloride, vinyl bromide, acrylonitrile, and methacrylonitrile; and the vinyl esters of the monocarboxylic acids, such as vinyl acetate, vinyl caproate, vinyl chloroacetate, vinyl benzoate, and vinyl valerate.

Emulsifying agents used in the aqueous medium may be any of the known ionic or non-ionic type emulsifying materials. Suitable materials include sodium and/or potassium myristate, laurate, palmitate, oleate, stearate, rosinate and/or hydroabietate; or alkali metal alkyl or alkylene sulfates, or sulfonates, such as sodium and/or potassium lauryl sulfate, cetyl sulfate, oleyl sulfonate, stearyl sulfonate, sulfonated Turkey red oil, sulfonated mineral oils, etc., as well as ammonium or ethanolamine salts thereof; salts of higher amines and non-ionic emulsifiers, such as described in U. S. 2,322,820. In all cases, it is preferred that the hydrocarbon radical of the emulsifying agent contains 10 to 20 carbon atoms.

The amount of the emulsifying agent used may vary over a wide range depending upon the particular system employed. In the finely dispersed systems, the amount of emulsifying agent will generally vary from 1% to 5% by weight, and more preferably from 1% to 3%. In the coarsely dispersed systems, such as that described above wherein the monomer is passed through the aqueous system as coarse drops or bubbles, much smaller amounts of agents can be utilized. In general, the concentration of the agent in these systems may vary from 0.05% to 2% by weight. With an ion-active emulsifier, there is employed in general between 0.01 to 0.2, and more preferably from 0.01 to 0.06 gram equivalents of emulsifier per kilogram of polymer present in the dispersion. A gram equivalent is the number of grams which is equal to the molecular weight divided by the number of positive (or negative) elementary electric charges formed on ionization of a molecule.

Catalysts may also be employed to accelerate the polymerization. Preferred polymerization catalysts include persulfuric acid, peracetic acid, percarbonic acid, perphosphoric acid, perphthalic acid, the persalts, such as potassium persulfate, the peroxides, such as hydrogen peroxide, cumene hydroperoxide and the like. Other catalysts can be used, such as benzoyl peroxide, tertiary butyl perbenzoate, acetyl benzoyl peroxide, lauryl peroxide, acetone peroxide, etc., if they form part of the well known redox systems of polymerization catalyzers, especially when operating at below about 35° C. Suitable catalyst systems are also combinations of oxygen and salts of sulfurous acid. The water-soluble polymerization catalyst, and particularly the water-soluble peroxide polymerization catalysts, are the more preferred.

The amount of the above-described catalysts to be used will vary over a wide range depending upon their type and desired rate of polymerization. In most instances, the amount of catalyst will vary from 0.1% to 5%, and more preferably from 0.1% to 1%, wherein the percentages are by weight based on the aqueous phase.

Any of the known modifiers, such as the chain-stoppers or transfer agents, may also be employed in such manner and in such concentration as is feasible and desirable according to the well-known recipes for polymerizing this particular type of monomer. Examples of such modifiers include butyl mercaptan, octyl mercaptan, decyl mercaptan, dodecyl mercaptan, benzyl mercaptan, thiobetanaphthol, nitro thiophenol, mercaptobenzothiazole, ethyl xanthogenyl monosulfide, isopropyl thioxanthogenyl trisulfide, tertiary dodecyl mercaptan, diphenyl disulfide, dibenzoyl disulfide, thiobenzoic acid, thiazyl-2-disulfide, and benzoyl ethyl sulfide and mixtures thereof.

The temperature employed in the process of the invention may be any of those generally employed in polymerizing monomers of this type. In general, the temperature utilized may be as low as −30° C. or lower and as high as 95° C. Preferred temperatures range from −20° C. to 90° C., and more preferably from 0° C. to 80° C.

The pressure employed in the process will depend upon the exact system selected. If the monomer is to be present in the reaction medium in the form of coarse liquid drops, the pressure should be sufficient to maintain the monomer in the liquid phase. On the other hand, if the monomer is to be present in the form of coarse bubbles, the pressure should be regulated so as to maintain the monomer in the gaseous or vapor phase. Generally, the pressure will vary from 1 atmosphere to about 50 atmospheres, and more preferably from 1 atmosphere to 10 atmospheres.

The polymers and copolymers produced in the above-described process may be recovered by any of the conventional techniques, such as coagulation by the addition of salts or solvents, freezing, and the like.

The process may be conducted in a batchwise, semi-continuous or continuous manner, but is preferably conducted in a continuous manner as indicated above wherein the aqueous phase is withdrawn at such a rate that the portions withdrawn contain less than the desired amount of polymer and then new aqueous phase is added to make up for that withdrawn with the polymer. Addition portions of emulsifying agent and catalyst are also preferably added to make up for that withdrawn with the polymer.

The polymers and copolymers produced by the process of the invention are soluble, heat-convertible polymers which are substantially free of branching and cross-linking. Such products may be cured in the presence of heat, light or catalyst to produce infusible products having qualities heretofore unknown for this type of polymer. The polymers and copolymers prepared from the dienes, for example, may be easily vulcanized to produce rubberlike products which have properties closely related to those of natural rubber. The tensile strength and elongation of these polymers are particularly outstanding. The polymers prepared from the other monomers, such as the unsaturated esters of the polycarboxylic acids or diallyl phthalate, may be cured to produce castings and coatings which are superior to those prepared from the fusible polymers prepared in the conventional manner, particularly as to hardness and flexibility.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

*Example 1*

A number of thick-walled glass tubes 50 cm. long and 2 cm. in diameter were three-quarters filled with a solution of the following composition:

| | Per cent by weight |
|---|---|
| Potassium oleate | 0.18 |
| Na$_4$P$_2$O$_7$, 10 aq | 0.55 |
| FeSo$_4$, 7 aq | 0.06 |
| Glucose | 0.55 |
| Cumene hydroperoxide (70 per cent) | 0.06 |
| Water | 98.60 |

Varying quantities of butadiene were then added. By evaporation of a portion of the butadiene the air was expelled from the tubes and the tubes then sealed by melting.

The temperature was raised to 20° C. and the tubes were mounted in a horizontal position in a shaking machine. In this machine the tubes were moved at intervals in a slightly inclined position in such a way that first the left end was 3 cm. higher than the right end and then the right end was 3 cm. higher than the left. This shaking took place at the rate of 16 cycles per minute.

After various periods of polymerization as shown in the table below, the tubes were taken out of the machine and opened. Phenyl beta-naphthylamine was added as a stabilizer in a quantity of 0.1 per cent by weight calculated on the total quantity of suspension.

The suspension was then coagulated by adding a mixture of 90 per cent by weight of methanol and 10 per cent by weight of sulphuric acid of 50% concentration. For coagulation, equal parts of the suspension and of the mixture of methanol and sulphuric acid were mixed together. The coagula were washed three times by kneading with methanol and were then dissolved in toluene.

The table below shows the conditions under which the polymerization was effected insofar as these conditions were varied. The viscosity values of the polymers in toluene at 25° C. are also shown in the last column.

| Ex. no. 3 | Period of Polymerization, Hours | Concentration of monomer at commencement of polymerization, percent by wt. | Concentration of polymer at the end of polymerization, percent by wt. | Concentration of polymer in solution, percent by wt. | Viscosity of solution, cs. |
|---|---|---|---|---|---|
| 1 | 1 | 5 | 0.5 | 7.0 | 33 |
| 2 | 1½ | 5 | 0.7 | 5.4 | 30 |
| 3 | 2 | 5 | 0.9 | 5.8 | 66 |
| 4 | 3 | 5 | 1.1 | 5.6 | 50 |
| 5 | 3½ | 6 | 2.1 | 5.9 | 53 |
| 6 | 18 | 8 | 4.3 | 5.7 | 2,921 |
| 7 | 18 | 11 | 7.5 | (1) | |

[1] Insoluble gel.

A comparison of the viscosity values in the last column of the above table clearly establishes that there was very little if any branching or cross-linking taking place when the concentration of the polymer was maintained at a relatively low level, but when the concentration reached the critical value of 7.5%, there was a rapid cross-linking of the polymer to produce an insoluble gel.

The polymers obtained in runs No. 1 to 6 above may be vulcanized to produce rubber-like products having excellent strength and elongation.

Example II

In this experiment, butadiene was polymerized at 0° C. in the same manner as in Example I. The conditions were the same as in Example I unless otherwise indicated. The composition of the aqueous phase was as follows:

Per cent by weight
Potassium oleate ............................................... 2.67
Cumene hydroperoxide ................................... 0.18
Na₄P₂O₇, 10 aq .................................................. 0.53
FeSO₄, 7 aq ....................................................... 0.23
Water .................................................................. 96.39

The table below shows the conditions under which the polymerization was effected insofar as these conditions were varied. The viscosity values of the solution in toluene at 25° C. are also shown in the table.

| Period of Polymerization, Hours | Concentration of monomer at commencement of polymerization, percent by wt. | Concentration of polymer at the end of polymerization, percent by wt. | Concentration of polymer in solution, percent by wt. | Viscosity of solution, c.s. |
|---|---|---|---|---|
| 2 | 12 | 6.0 | 5.9 | 89 |
| 4 | 12 | 7.3 | 5.4 | 110 |
| 5 | 12 | 7.7 | 6.2 | 114 |
| 17 | 20 | 15.7 | 4.5 | 4.7 |
| 17 | 25 | 16 | (1) | |

[1] Insoluble gel.

Example III

The reaction apparatus used in this experiment consisted of a vertically positioned tube of steel 200 cm. high and with an internal diameter of 10 cm. The tube was provided with an inspection window situated 160 cm. above the bottom. The two ends were closed by flanges, the bottom flange being fitted with a distributor for the monomer. The top and bottom of the tube were furthermore connected by a circulation pipe of steel in which there was a heat exchanger and a pump. In the distributor were five nozzles of 6 mm. internal diameter.

The tube was filled to about three-quarters full with an aqueous solution containing 0.5% potassium oleate and 0.4% potassium sulphate in water and sufficient sodium hydroxide to bring the pH to a value of 10.1. The remaining space was then filled with butadiene which had been purified by rectification and to which 0.5 per cent by weight of tertiary dodecyl mercaptan had been added.

The butadiene was circulated by pumping at a rate of 25 liters per hour. Polymerization was started by heating the system to 55° C., said heating being effected by passing steam into the heat exchanger. Later, the temperature was lowered to 50° C. and maintained at that figure by introducing cold water into the heat exchanger. The speed of circulation was gradually increased to 60 liters per hour. The linear speed at which the monomer was passed into the aqueous phase was then 12 cm./sec.

The apparatus was kept entirely filled during polymerization by supplying the butadiene at the rate of about 1½ liters per hour.

Polymerization was continued until the concentration of the polymer in the suspension had increased to 5 per cent by weight. The mean speed of polymerization was 40 parts per liter of aqueous phase per hour.

The polymer obtained by this method can be vulcanized to produce rubber-like products having improved tensile strength and elongation.

Polymers having related properties may be obtained by using equivalent amounts of each of the following compounds in place of the butadiene: chloroprene, isoprene, and 2-methylbutadiene.

Example IV

This experiment was substantially the same as that in Example III with the exception that a mixture of butadiene and styrene in the ratio of 75:25 by weight was employed as the monomer instead of the butadiene. The quantity of tertiary dodecyl mercaptan added at the commencement was .05% calculated on the weight of the mixture of monomers.

The speed of circulation and the linear speed of the monomer were as in Example III.

Polymerization was continued until the concentration of the polymer in the suspension had increased to 6% by weight and then stopped. The polymer obtained in this experiment could be vulcanized to produce a product having properties very closely related to those of natural rubber.

Related copolymers are obtained by replacing the butadiene-styrene mixture in the above-described process with equivalent amounts of each of the following monomers; acrylonitrile, methacrylonitrile and chlorostyrene.

Example V

Diallyl phthalate (6 parts) is added to the aqueous mixture shown in Example I and the mixture heated at 50° C. until the concentration of polymer is about 3% and then the reaction is stopped. The resulting polymer can be further polymerized to produce a hard strong casting.

Similar results may be obtained with diallyl succinate and diallyl adipate.

We claim as our invention:

1. A process for preparing a heat-convertible polymer of a substantially water-insoluble polyethylenically unsaturated organic compound which polymer is substantially free of branching and cross-linking, which comprises polymerizing the said unsaturated compound at a temperature not in excess of 95° C. in a two phase system comprising a solution of an emulsifier in water as the continuous phase and a discontinuous phase containing the said unsaturated organic compound so as to effect at least a 50% conversion of monomer to polymer and at the same time maintaining the concentration of the resulting polymer in the reaction zone at all times below that level at which gelation occurs.

2. The process as defined in claim 1 wherein the concentration of polymer is maintained below 7.5%, and the temperature of reaction varies between 20° C. and 80° C.

3. The process as defined in claim 1 wherein the concentration of the polymer is maintained below about 16% and the temperature of the reaction is below about 0° C.

4. The process as defined in claim 1 wherein the conversion of monomer to polymer is at least 75%.

5. A process for preparing a heat-convertible polymer of a substantially water-insoluble polyethylenically unsaturated organic compound and a dissimilar ethylenically unsaturated compound copolymerizable therewith which copolymer is substantially free of branching and cross-linking, which comprises polymerizing a mixture of the said polyethylenically unsaturated compound and the dissimilar unsaturated compound at a temperature not in excess of 95° C. in a two phase system comprising a solution of an emulsifier in water as the continuous phase and a discontinuous phase comprising the mixture of monomers so as to effect at least a 50% conversion of monomer to polymer and at the same time maintaining the concentration of the polymer in the reaction zone at all times below that level at which gelation of the polymer occurs.

6. A process for preparing a heat-convertible polymer of a substantially water-insoluble aliphatic organic compound having two conjugated ethylenic groups in a chain of carbon atoms which polymer is substantially free of branching and cross-linking, which comprises polymerizing the said unsaturated compound at a temperature between 15° C. to 80° C. in a two phase system comprising a solution of an emulsifier in water as the continuous phase and a discontinuous phase containing the said unsaturated compound so as to effect at least a 50% conversion of the monomer to polymer and at the same time maintaining the concentration of the polymer in the reaction zone at all times below 7.5%.

7. The process as defined in claim 6 wherein the concentration of the polymer is maintained between 1% and 7.5%.

8. The process as defined in claim 6 wherein the concentration of the polymer is maintained below 5%.

9. The process as defined in claim 6 wherein the concentration of the polymer is maintained at the desired level by stopping the reaction before the concentration of polymer has reached 7.5%.

10. The process as defined in claim 6 wherein the concentration of the polymer is maintained at the desired level by withdrawing portions of the polymer-containing aqueous phase and adding fresh aqueous phase to make up for that withdrawn with the polymer.

11. The process as defined in claim 6 wherein the unsaturated organic compound is passed through the continuous phase as drops having a diameter between 0.1 to 2 centimeters, said drops being collected at the opposite vertical end of the reaction zone as a separate phase in contact with the aqueous phase.

12. A process for preparing a heat-convertible polymer of a substantially water-insoluble polyethylenically unsaturated organic compound that is substantially free of branching and cross-linking, which comprises polymerizing the said unsaturated compound at a temperature between 15° C. to 80° C. in an aqueous medium containing an emulsifying agent and polymerization catalyst so as to effect at least a 50% conversion of the monomer to polymer and at the same time maintaining the concentration of the polymer in the reaction zone at all times below 7.5%.

13. The process as defined in claim 12 wherein the unsaturated compound is butadiene.

14. The process as defined in claim 12 wherein the unsaturated compound is diallyl phthalate.

15. A process for preparing a heat-convertible copolymer of an aliphatic compound having two conjugated ethylenic groups containing from 4 to 12 carbon atoms and a dissimilar unsaturated compound containing a polymerizable =C=C= group, which comprises polymerizing a mixture of the said aliphatic compound and dissimilar unsaturated compound at a temperature not in excess of 95° C. in an aqueous medium containing an emulsifying agent and polymerization catalyst so as to effect at least a 50% conversion of the monomer to polymer and at the same time maintaining the concentration of the polymer in the reaction zone at all times below 7.5%.

16. The process as defined in claim 15 wherein the monomers are butadiene and styrene.

17. A process for preparing a heat-convertible polymer of an aliphatic compound containing two conjugated ethylenic groups in a chain of carbon atoms which comprises passing liquid drops of the said aliphatic compound through an aqueous medium containing an emulsifying agent and a peroxide polymerization catalyst and being maintained at a polymerizing temperature not in excess of 95° C. under such conditions that the drops pass through the medium due to the difference in density of the two phases and a portion of the drops subsequently collected as a separate phase in contact with the said aqueous medium, and at the same time maintaining the concentration of the resulting polymer in the aqueous medium at all times below 7.5%, the concentration of the monomer dissolved in the aqueous medium being maintained at the end below about 7%.

18. The process as defined in claim 17 wherein the monomer is butadiene and the concentration of the polymer is maintained below 7.5%.

19. The process as in claim 17 wherein the monomer is chloroprene.

References Cited in the file of this patent

UNITED STATES PATENTS

| | | |
|---|---|---|
| 2,465,363 | Faragher et al. | Mar. 29, 1949 |
| 2,537,334 | De Nie | Jan. 9, 1951 |